United States Patent
Judson

(10) Patent No.: US 6,792,289 B1
(45) Date of Patent: Sep. 14, 2004

(54) NON-BANDLIMITING ANTENNA SHARING METHOD AND APPARATUS FOR BASE STATIONS

(75) Inventor: Bruce A. Judson, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/436,083

(22) Filed: Nov. 8, 1999

(51) Int. Cl.$^7$ ................................................ H04Q 7/20
(52) U.S. Cl. ...................................... 455/562.1; 455/82
(58) Field of Search ......................... 455/422, 13.3, 455/13.4, 19, 25, 78, 82, 83, 560, 561, 562, 550, 11.1, 307; 342/359, 360, 361

(56) References Cited

U.S. PATENT DOCUMENTS

| | | | | |
|---|---|---|---|---|
| 4,041,389 A | * | 8/1977 | Oades ........................ 455/17 |
| 4,109,202 A | * | 8/1978 | Kudsia et al. ................. 455/17 |
| 4,186,344 A | * | 1/1980 | Higuchi et al. ............... 455/86 |
| 4,206,464 A | * | 6/1980 | Hirsch ........................ 333/1.1 |
| 4,430,619 A | * | 2/1984 | Epsom et al. ................ 327/100 |
| 4,791,421 A | * | 12/1988 | Morse et al. ................. 342/368 |
| 4,901,307 A | | 2/1990 | Gilhousen et al. ............. 370/18 |
| 5,056,109 A | | 10/1991 | Gilhousen et al. ............. 375/1 |
| 5,103,459 A | | 4/1992 | Gilhousen et al. ............. 375/1 |
| 5,129,099 A | * | 7/1992 | Roberts ...................... 455/82 |
| 5,187,806 A | * | 2/1993 | Johnson et al. ............... 455/15 |
| 5,363,402 A | * | 11/1994 | Harmon ..................... 375/132 |
| 5,446,782 A | * | 8/1995 | Kurokawa et al. ............. 455/557 |
| 5,499,394 A | * | 3/1996 | Kaatz et al. ................. 455/266 |
| 5,634,203 A | * | 5/1997 | Ghaem ........................ 455/134 |
| 5,815,803 A | * | 9/1998 | Ho et al. ..................... 333/1.1 |
| 5,854,986 A | | 12/1998 | Dorren et al. ................ 455/562 |
| 5,946,606 A | * | 8/1999 | Shimizu ..................... 455/67.1 |
| 5,987,308 A | * | 11/1999 | Ookita ........................ 455/83 |
| 6,005,884 A | * | 12/1999 | Cook et al. ................. 375/202 |
| 6,108,313 A | * | 8/2000 | Lee et al. ..................... 455/78 |
| 6,121,925 A | * | 9/2000 | Hilliard ...................... 342/374 |
| 6,215,443 B1 | * | 4/2001 | Komatsu et al. ......... 343/700 MS |
| 6,226,275 B1 | * | 5/2001 | Yang et al. .................. 370/280 |
| 6,342,777 B1 | * | 1/2002 | Takahashi ................... 370/315 |
| 6,374,094 B1 | * | 4/2002 | Zappala ..................... 455/188.1 |
| 6,392,770 B1 | * | 5/2002 | Sasai et al. .................. 359/136 |

FOREIGN PATENT DOCUMENTS

| | | |
|---|---|---|
| EP | 0741463 | 11/1996 |
| FR | 2759513 | 1/1998 |

* cited by examiner

Primary Examiner—Jean Gelin
(74) Attorney, Agent, or Firm—Russell B. Miller; Christopher O. Edwards

(57) ABSTRACT

A method and apparatus for sharing antennas between bases stations that is non-band limiting. A transmit signal is received at a first port coupled to a base station. The transmit signal travels from the first port through a plurality of circulators prior to being transmitted by an antenna. A received signal is received at a second port that is communicatively coupled to the antenna. The received signal conceptually travels through the apparatus in a reverse direction to the transmit signal, through at least one of the circulator units, and is admitted to the base station using at least the same port that received the transmit signal. The signal may be split, and also received by a different base station.

17 Claims, 4 Drawing Sheets

NON-BANDLIMITING ANTENNA SHARING METHOD AND APPARATUS FOR BASE STATIONS

BACKGROUND OF THE INVENTION

1. Field of the Invention

The present invention relates to communications. More particularly, the invention concerns a non-bandlimiting method and apparatus for sharing common antennas used to receive and transmit signals in a wireless communications network.

2. Description of the Background Art

A modern day communication network is required to support a variety of applications. One such communication network is a code division multiple access (CDMA) network that conforms to the "TIA/EIA/IS-95 Mobile Station-Base Station Compatibility Standard for Dual-Mode Wideband Spread Spectrum Cellular System," hereinafter referred to as IS-95. The CDMA network allows for wireless voice and data communications between users. The use of CDMA techniques in a multiple access communication networks is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 13, 1990 and U.S. Pat. No. 5,103,459, entitled "SYSTEM AND METHOD FOR GENERATING WAVEFORMS IN A CDMA CELLULAR TELEPHONE SYSTEM," issued Apr. 7, 1992, both of which are assigned to the assignee of the present invention and incorporated by reference herein.

In a CDMA network, a land-based data network can communicate with a subscriber station, typically a mobile cellular telephone, via one or more base stations. The base stations are communicatively coupled to the subscriber stations by a "forward link." The subscriber station communicates with the land-based data network by transmitting data on a "reverse link" to a base station. A link is simply a communications connection used to transmit data from a source to a destination. The base station receives and routes received data, using a base station controller (BSC), to the land-based data network. For example, a subscriber station transmits a signal to the base station using an antenna and another antenna located at the base station receives the transmitted signal. This signal is processed and communicated further using the land-based data network. In a wireless network, a forward link and a reverse link may or, may not be allocated separate frequencies. Given the growing demand for wireless data applications, the need for very efficient wireless data communication networks have become increasingly significant.

To allow a network to handle more subscriber calls, the geographical area served by the communications network may be split up. These partitioned areas are called sectors or "cells," and one or more base stations may be assigned to service the communications from subscriber stations located within any sector or sectors. Further, a signal received at an antenna may be routed to one or more base stations. As mentioned above, a base station (BTS) both receives and transmits communication signals. It is common for a BTS to have a single transmit signal and two receive signals, and to allow BTS transceiver subsystems from two different sectors to share an antenna.

To share antennas, a receive multi-coupler (RMC) 100 as shown in FIG. 1 is commonly used. Antenna 102 receives and transmits signals from the BTS to which the antenna 102 is connected. A surge protector 104 may be coupled to the antenna to prevent against unusual energy conditions, such as lighting striking the antenna. A duplexer 106 is coupled to the antenna 102 to facilitate the simultaneous transmission of signal 114 and the receipt of signals 116 and 118. Signal 114 is transmitted using antenna 102, and signals 116 and 118 are received using the antenna 102. A low noise amplifier (LNA) 108, a gain adjustment attenuator 110, and a power divider 112 are arranged to provide the signals 116 and 118. LNA 108 may also be connected to a fault detection unit 120. The design shown in FIG. 1 requires special filters, also referred to as duplexer 106, to split or combine signals using varying frequencies. Each of the signals 114, 116, and 118 are communicated to the base station using separate ports (not shown). FIG. 1 also shows a second arrangement within RMC 100 that works substantially as described above.

It is also common practice for a BTS to combine one transmit signal and one receive signal into one port rather than the multi-port configuration shown in FIG. 1. However, in this case, the RMC 100 as shown will not work. Another duplexer such as duplexer 106 would have to be added at the transmit/receive (TX/RX) inputs to separate a transmit signal from a received signal, and then use distinctly different and separate paths to route the signals. A path is a route between any two nodes, and may include more than one branch. This design separates the direction of the TX/RX signals, but does not consider the frequencies of the signals. Further, this modification to RMC 100 increases its cost and size, and reduces the performance of the unit.

What is needed is an invention that provides a method and apparatus that allows TX/RX signals to be processed using common hardware elements and substantially similar paths. The invention should allow a TX signal and a RX signal to be communicated to a base station using a common port, and provide for a received signal to be split and routed to a different base station using the same hardware.

SUMMARY OF THE INVENTION

The present invention is a method and apparatus that processes combined TX/RX signals using common hardware elements. The invention permits one port to commonly communicate a TX signal and a RX signal using a single port to a base station.

In one embodiment, the present invention comprises a non-band limiting method to share antennas where a signal to be transmitted is received at a first port. This first port is communicatively coupled to a base station. This "transmit" signal travels from the first port through a plurality of direction units prior to being transmitted by an antenna. The direction units assure the transmit signal follows a desired path through the sub-network. Another signal is received at a second port communicatively coupled to an antenna. This "received" signal conceptually travels in a reverse direction to the transmit signal and through at least one of the direction units. The received signal shares a somewhat common path with the transmit signal, and is admitted to the base station at the same port that the transmit signal was received. The received signal is also split and received by a second base station.

In another embodiment, the invention may be implemented to provide an apparatus for sharing antennas that is non-band limiting. A transmit signal is received at a first port coupled to a base station. The transmit signal travels from the first port through a plurality of circulators prior to being transmitted by an antenna. A received signal is received at a second port communicatively coupled to the antenna. The received signal conceptually travels through the apparatus in a reverse direction to the transmit signal, through at least one of the circulator units, and is admitted to the transmitting base station using the same port from which the transmit signal originated. The received signal may also be split and received by a second base station.

The invention affords its users with a number of distinct advantages as found in its various embodiments. For example, one advantage is that the invention may be used in most wireless telecommunication networks where antenna sharing is desirable. Another advantage is that the direction, or path, of the transmit signal and the received signal are controlled, not the frequency of the signals. Still another advantage is that both the transmit signal and the received signal are processed using common hardware elements.

BRIEF DESCRIPTION OF THE DRAWING

The nature, objects, and additional advantages of the invention will become more apparent to those skilled in the art after considering the following detailed description in connection with the accompanying drawings, in which like reference numerals designate like parts throughout, and wherein.

DETAILED DESCRIPTION OF THE EXEMPLARY EMBODIMENTS

Figure 1:
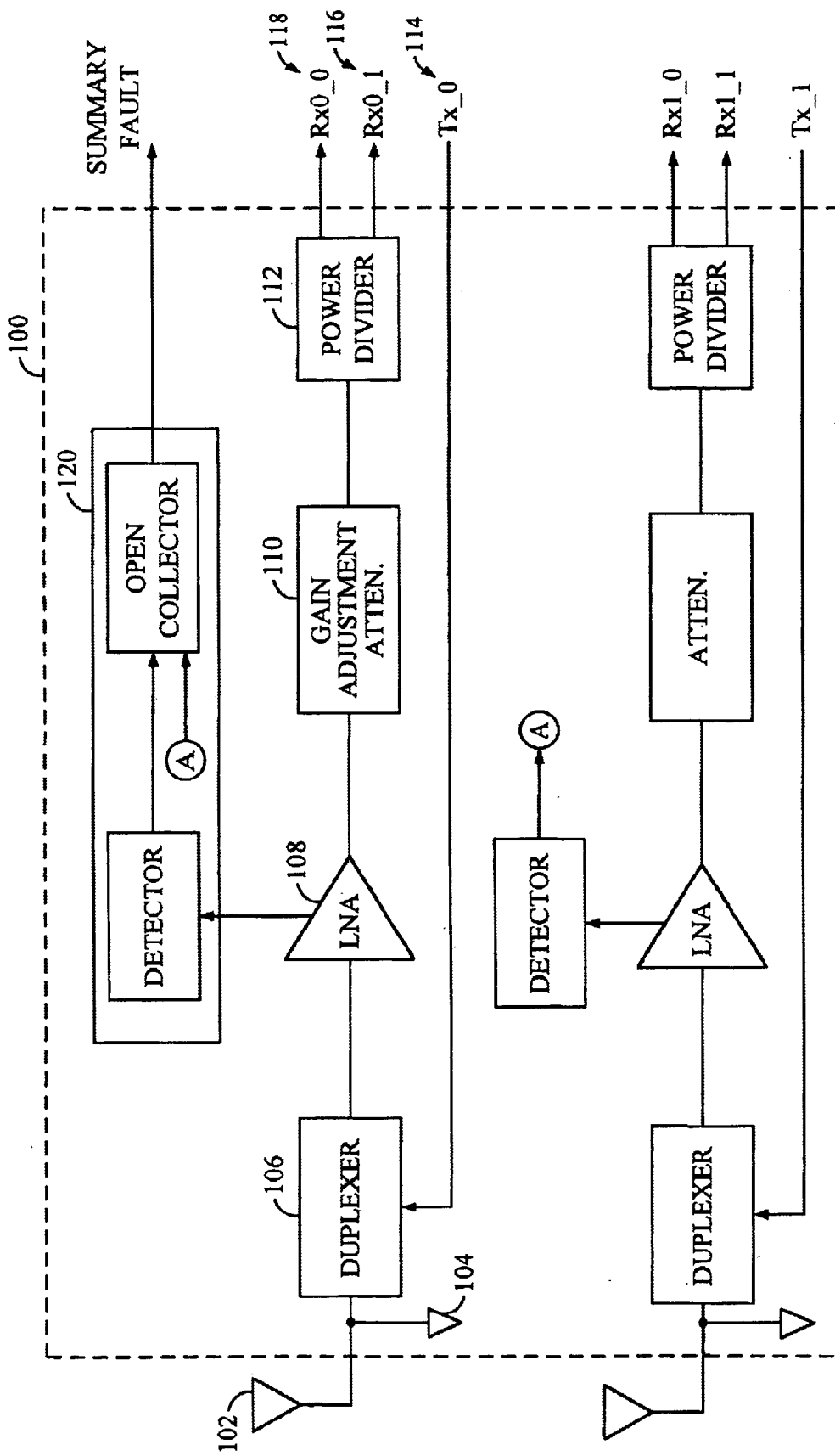
FIG. 1 is a diagram of a prior art receive multi-coupler (RMC)
Figure 2A:
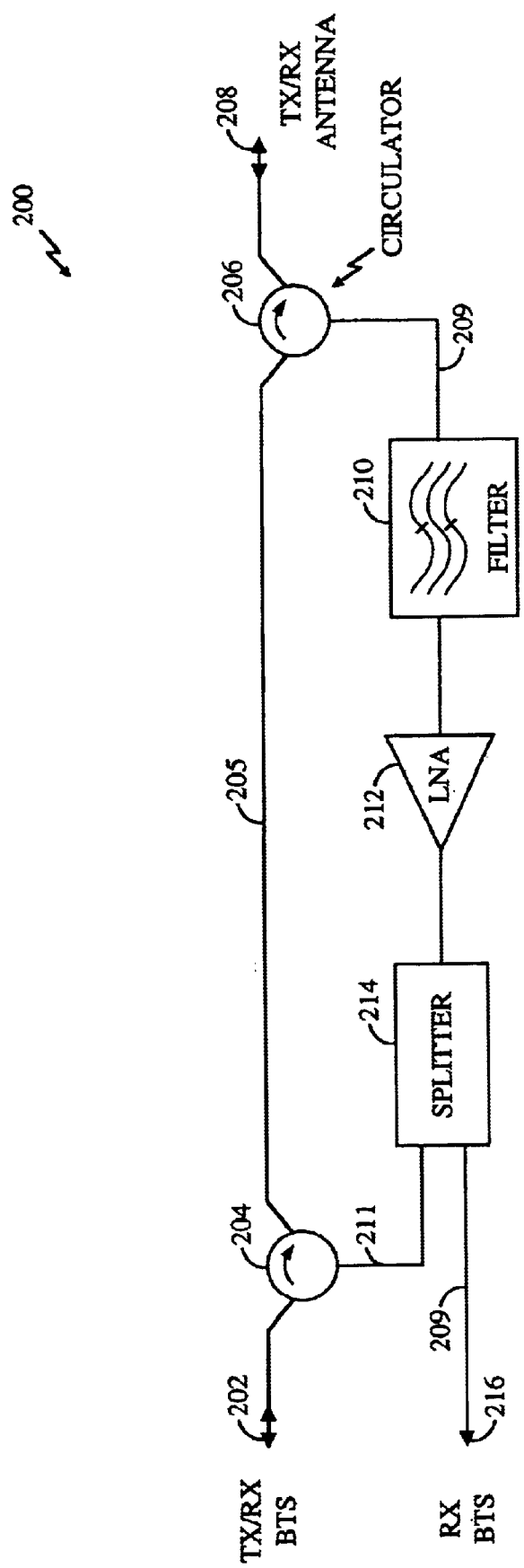
FIG. 2a illustrates a non-bandlimiting antenna sharing unit in accordance with one embodiment of the present invention.
Figure 2B:
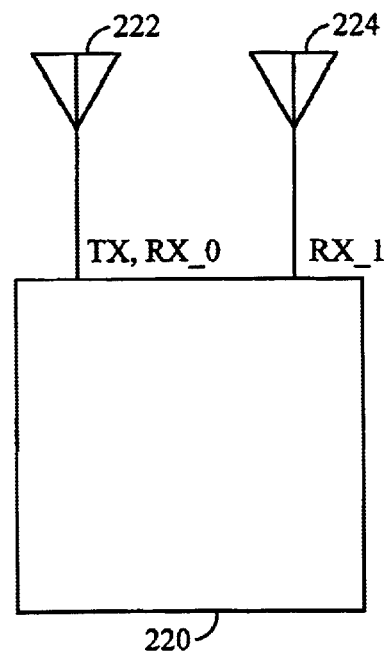
FIG. 2b illustrates a prior art antenna arrangement for a base station.
Figure 2C:
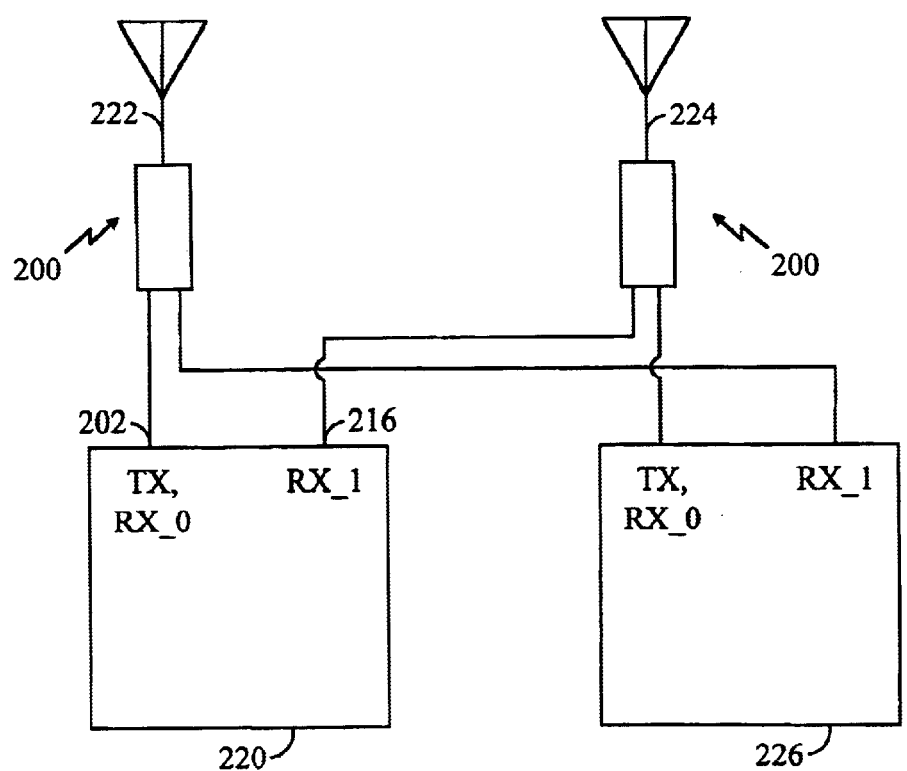
FIG. 2c illustrates an implementation of the non-band limiting antenna sharing unit shown in FIG. 2a in accordance with one embodiment of the present invention.
Figure 3:
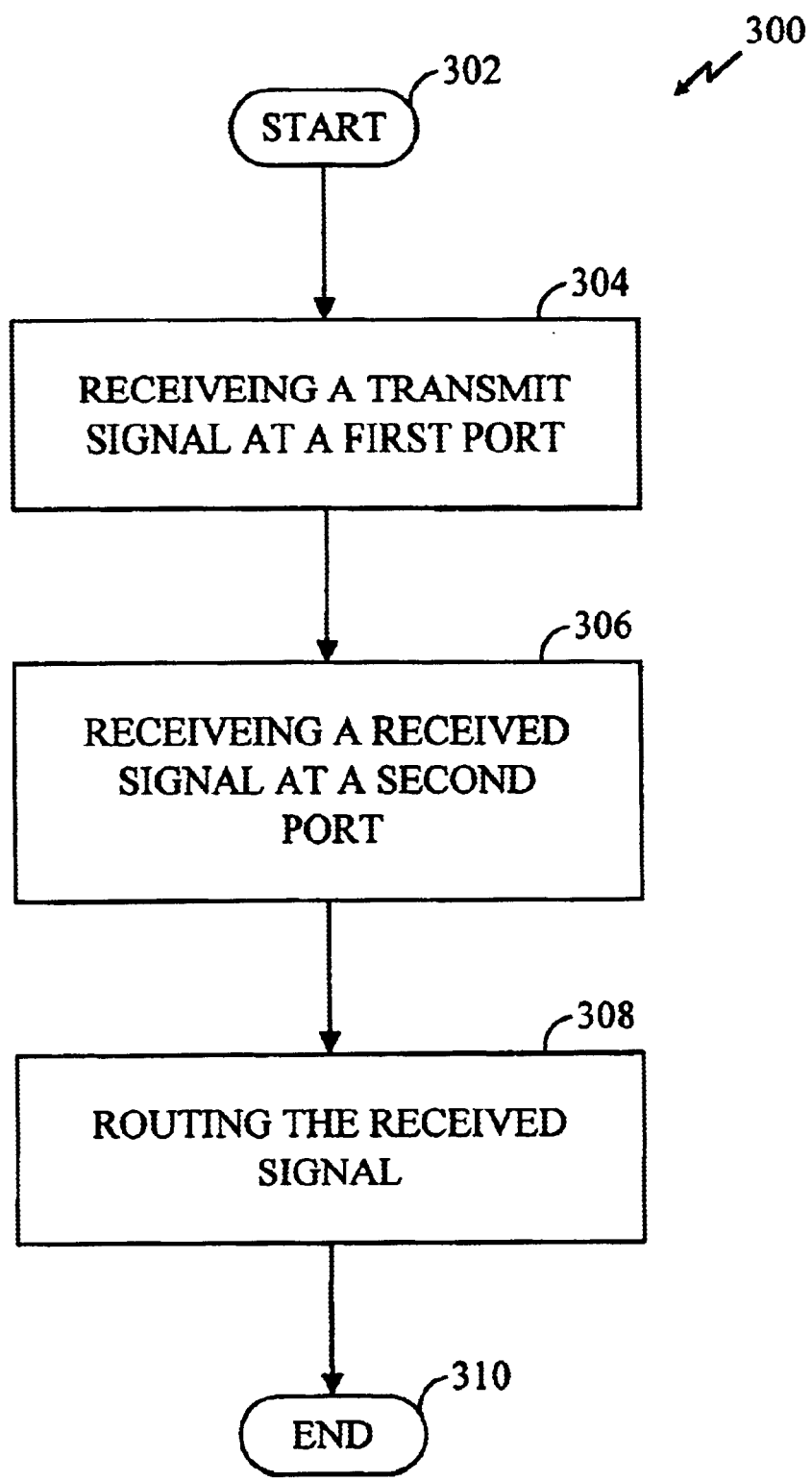
FIG. 3 is a chart showing the method steps in accordance with one embodiment of the present invention.

FIGS. 2 and 3 illustrate examples of various apparatus and method aspects of the present invention. For ease of explanation, but without any limitation intended, these examples are described in the context of a spread spectrum wireless communications network. As discussed below, various hardware components and interconnections may embody the apparatus embodiment of the present invention. Different arrangements for such apparatuses will become apparent to anyone schooled in the art after reading the descriptions that follow.

In a spread spectrum network, a subscriber station communicates with one or more base stations by sending a signal to an antenna or antennas communicatively coupled to the base stations. Throughout the following discussion, reference to a base station means one or more base stations, and reference to an antenna means one or more antennas, unless otherwise indicated. Likewise, to communicate with the subscriber station, a base station transmits a signal using the antenna.

In the exemplary embodiment, the spread spectrum communication system is a CDMA direct-sequence spread spectrum communication system. Examples of such a system are discussed in U.S. Pat. No. 5,056,109, issued Oct. 8, 19991 and entitled "METHOD AND APPARATUS FOR CONTROLLING TRANSMISSION POWER IN A CDMA CELLULAR MOBILE TELEPHONE SYSTEM," and U.S. Pat. No. 5,103,459, issued Apr. 7, 1992, and entitled "SYSTEM AND METHOD FOR GENERATING WAVEFORMS IN A CDMA CELLULAR TELEPHONE SYSTEM," issued both of which are incorporated by reference herein. In a direct-sequence spread spectrum communication system employing one or multiple carriers, transmitted signals are spread over a frequency band greater than the minimum bandwidth necessary to transmit the information by modulating a carrier wave by the data signal, then modulating the resulting signal again with a wide band spreading signal. It should be understood that the present invention is not limited to the CDMA communication networks mentioned herein, but may be applied to any communication network where a shared antenna arrangement is desirable.

To communicate, a subscriber station synchronizes to the signals transmitted from a base station. After finding the phase of the signal, the frequency is found by using a demodulation element that has hardware for both phase and frequency tracking. A subscriber station finds the phase of a received signal by testing a set of phase hypotheses, referred to as a "window," and determining if one of the hypothetical phase hypotheses, also referred to as offset hypotheses, is correct. The size of a window correlates to the number of hypothetical phase hypotheses to be tested, that is, the larger the number of hypothesis, the larger the window.

The antenna is communicatively connected to a base station using at least one port. Generally, a transmit signal and a receive signal share a port. In another embodiment, a different port is also available as a receive port.

Hardware Components and Interconnections

FIG. 2a illustrates one embodiment of an apparatus 200 of the present invention. The apparatus is a sub-network that may be implemented in a communications network, and in an exemplary embodiment, is implemented in a CDMA wireless communication network. A transmit/receive (TX/RX) port 202 is connected to a base station (BTS) (not shown) and a first direction unit 204. Connected refers to being communicatively coupled unless indicated otherwise. When a TX signal is received by TX/RX port 202, the first direction unit 204 routes the signal along path 205 connecting to a second direction unit 206. The second direction unit 206 is connected to a second port 208. The direction units are low energy loss units, such as a circulator or other similar routing device, and are used to route a received signal along a preferred communications path. The second port 208 connects an antenna to the sub-network 200.

When the second port 208 receives a received signal, it travels to second direction unit 206 and is routed along path 209 to a filter 210. The filter 210 permits a certain range of frequencies to pass along path 209 while suppressing unwanted frequencies or noise. For example, assume that energy is reflected back from the antenna to the sub-network 200 during the transmission of the transmit signal. The reflected energy would travel along path 209 and be rejected by the filter 210.

Filtered signals pass from the filter 210 to an amplifier 212 that is connected to the filter 210. Amplifier 212 increases the strength of the signal it receives and passes the signal to a splitter 214. In one embodiment, the amplifier 212 is a low noise amplifier, and the splitter 214 is an analog device that divides one input signal into two output signals. The splitter 214 passes the split received signal along path 211 to the first direction unit 204, where it is routed to the TX/RX port 202 and/or to a third port 216 connected to a different base station. The received signal is admitted to the base station (not shown) via the TX/RX port 202, and to the different base station via third port 216.

FIGS. 2b and 2c show a general comparison of a prior art antenna implementation for a base station versus the shared antenna arrangement made possible by the present invention. In FIG. 2b, a base station 220 is coupled to two antennas 222 and 224. Antenna 222 is used to both transmit and receive signals. Antenna 224 receives signals. This arrangement requires two ports and two antennas to be used by the base station when communicating with the communications network.

FIG. 2c shows the antennas 222 and 224 coupled to the base station 220 and a base station 226. Each base station is coupled to the antennas 222 and 224 using two ports. For example, base station 220 is coupled to the antenna 222 using TX/RX port 202 and third port 216. However, because apparatus 200 as shown in FIG. 2a is employed between the antennas and the base stations as shown, the two antennas 222 and 224 may be shared by the base stations 220 and 226.

Operation

FIG. 3 is a flowchart illustrating a method 300 of the present invention. The method starts in task 302 and a transmit signal is received at a first port communicatively coupled to a base station. The transmit signal travels from the first port through a plurality of direction units prior to being transmitted by an antenna. In one embodiment, when the sub-network is duplexed, a received signal may simultaneously be received in task 306, and routed in task 308, from a second port coupled to the antenna through the sub-network. Duplexed refers to a network that accepts independent communications in both directions —transmit and receive—simultaneously. The received signal is routed to the first port in a reverse direction to the transmit signal, through at least one of the direction units, and along a similar path as the path used by the transmit signal. In other embodiments, this path is different in part than the path used by the transmit signal, but substantially similar.

Regardless, the received signal is routed to the base station and admitted via one or more ports. One of these ports coupling the sub-network and the base station allows both transmit signals and received signals to share the port.

Other Embodiments

While there have been shown what are presently considered to be exemplary embodiments of the invention, it will be apparent to those skilled in the art that various changes and modifications can be made without departing from the scope of the invention as defined by the appended claims.

What is claimed is:

1. A method for sharing antennas, comprising:
   receiving a transmit signal at a first port communicatively coupled to a base station, wherein the transmit signal travels from the first port through a plurality of direction units prior to being transmitted by an antenna, the direction units assure the transmit signal follows a desired transmit path;
   receiving a received signal at a second port communicatively coupled to the antenna; and
   routing the received signal to the first port or optionally to a third port coupled to another base station in a reverse direction to the transmit signal, through at least one of the direction units, through a rejection filter for rejecting frequencies used for transmission of the transmit signal, and along a path used by the transmit signal, the at least one direction unit routes the received signal along the desired receive path.

2. The method in accordance with claim 1, wherein the path along which the received signal is routed is similar to the path used by the transmit signal.

3. The method in accordance with claim 1, wherein the received signal and the transmit signal are duplexed.

4. An apparatus for sharing antennas, comprising:
   a first port, wherein the first port is communicatively coupled to a first base station;
   a second port communicatively coupled to an antenna;
   a third port communicatively coupled to a second base station;
   a plurality of direction units communicatively coupled to the first port and the second port, wherein the plurality of direction units prevents a transmit signal received at the first port from traveling the same path as a receive signal that is received at the second port travels, wherein at least one direction unit routes the received signal along the desired receive path, and wherein the receive signal is admitted to the first base station at the first port or optionally to the second base station at the third port; and
   a rejection filter on a receive path suppressing frequencies of a transmit signal.

5. The apparatus in accordance with claim 4, wherein the plurality of direction units prevents the transmit signal from traveling substantially the same path as the received signal.

6. The apparatus in accordance with claim 4, wherein the plurality of direction units prevents the transmit signal from traveling a similar path as the received signal.

7. The apparatus in accordance with claim 4, wherein the apparatus is a duplexed apparatus.

8. The apparatus in accordance with claim 4, further comprising;
   a filter communicatively connected to at least one of the plurality of direction units;
   an amplifier communicatively connected to the filter; and
   a signal splitter communicatively coupled to the amplifier, at least one of the plurality of direction units, and the third port.

9. A method for processing signals in a wireless communication system, comprising:
   routing a transmit signal from a base station along a first path through a plurality of directions units to an antenna, the direction units assure the transmit signal follows a desired transmit path;
   receiving a receive signal at the antenna; and
   routing the receive signal along a second path through at least one of the plurality of direction units, the at least one direction unit routes the received signal along the desired receive path comprising:
      filtering out transmit frequencies, wherein transmit frequencies and receive frequencies are different;
      splitting the received signal; and,
   optionally routing the received signal to a third port.

10. A method as in claim 9, wherein routing the receive signal further comprises:
    amplifying the receive signal.

11. An apparatus for processing transmit and receive signals in a wireless communication system, comprising:
    a first port coupled to a transceiver;
    a first direction unit coupled to the first port;
    a second direction unit coupled to the first port via a first path and second path, the first direction unit assures the transmit signals follow the first path, the second direction unit routes the receive signals along the second path to the first port and optionally to a third port coupled to another transceiver;

a filter coupled between the second direction unit and the first direction unit on the second path, wherein the filter is adapted to filter out transmit frequencies; and a splitter coupled between the filter and the first direction unit an the second path.

12. An apparatus as in claim 11, further comprising:

an amplifier coupled between the filter and the amplifier on the second path.

13. An apparatus as in claim 11, wherein transmit signals travel from the first direction unit to the second direction unit.

14. An apparatus as in claim 11, wherein receive signals travel from the second direction unit to the first direction unit.

15. The apparatus as in claim 14, wherein the antenna is used by a plurality of base stations.

16. A method for sharing antennas, comprising:

receiving a transmit signal at a first port communicatively coupled to a base station selecting a processing path in response to the transmit signal, wherein the path is defined from the first port through a plurality of direction units prior to being transmitted by an antenna;

receiving a received signal at a second port communicatively coupled to the antenna;

selecting a second processing path in response to the frequency of the receive signal; and routing the received signal on the second path, wherein the second path is defined to the first port and optionally to a third port coupled to another base station in a reverse direction to the transmit signal, through at least one of the direction units, through a rejection filter for rejecting frequencies of the transmit signal, and along at least a portion of the path used by the transmit signal.

17. An apparatus for sharing antennas, comprising:

means for receiving a transmit signal at a first port communicatively coupled to a base station means for selecting a processing path in response to the transmit signal, wherein the path is defined from the first port through a plurality of direction units prior to being transmitted by an antenna;

means for receiving a received signal at a second port communicatively coupled to the antenna;

means for selecting a second processing path in response to the frequency of the receive signal; and means for routing the received signal on the second path, wherein the second path is defined to the first port and optionally to a third port coupled to another base station in a reverse direction to the transmit signal, through at least one of the direction units, through a rejection filter for rejecting frequencies of the transmit signal, and along at least a portion of the path used by the transmit signal.

* * * * *